(12) United States Patent
Lavoie et al.

(10) Patent No.: US 9,009,351 B2
(45) Date of Patent: Apr. 14, 2015

(54) BROKERAGE TRANSACTION SERVER AND METHOD USING ENCAPSULATED MESSAGES

(75) Inventors: Richard J. Lavoie, Waltham, MA (US); Robert M. France, Carlisle, MA (US); Raymond Chow, Waltham, MA (US); Anthony Amicangioli, Newton, MA (US)

(73) Assignee: Lime Brokerage LLC, Waltham, MA (US)

( * ) Notice: Subject to any disclaimer, the term of this patent is extended or adjusted under 35 U.S.C. 154(b) by 414 days.

(21) Appl. No.: 12/829,742

(22) Filed: Jul. 2, 2010
(Under 37 CFR 1.47)

(65) Prior Publication Data
US 2011/0016221 A1    Jan. 20, 2011

Related U.S. Application Data

(60) Provisional application No. 61/224,237, filed on Jul. 9, 2009.

(51) Int. Cl.
*G06F 15/16* (2006.01)
*G06Q 40/04* (2012.01)

(52) U.S. Cl.
CPC ..................................... *G06Q 40/04* (2013.01)

(58) Field of Classification Search
CPC ................. G06Q 40/04; H04L 69/08
USPC .............. 709/246, 230, 223, 231; 705/35, 37
See application file for complete search history.

(56) References Cited

U.S. PATENT DOCUMENTS

| | | | |
|---|---|---|---|
| 5,864,827 A | 1/1999 | Wilson | 705/35 |
| 6,085,200 A * | 7/2000 | Hill et al. | 707/999.202 |
| 7,424,452 B2 * | 9/2008 | Feilbogen et al. | 705/37 |
| 7,610,239 B1 * | 10/2009 | Silverman et al. | 705/37 |
| 8,073,763 B1 * | 12/2011 | Merrin et al. | 705/37 |
| 2003/0167223 A1 * | 9/2003 | Pledereder et al. | 705/37 |
| 2005/0038723 A1 * | 2/2005 | Nishimaki | 705/35 |
| 2007/0288254 A1 * | 12/2007 | Eisner | 705/1 |
| 2008/0077601 A1 * | 3/2008 | Liou et al. | 707/100 |
| 2008/0154756 A1 * | 6/2008 | Deudney | 705/35 |

(Continued)

OTHER PUBLICATIONS

David J. Thibodeau, Jr., Letter to Jakobsche RE: Application—Anthony Amicangioli's signature, 2 pages, Jul. 7, 2010.

(Continued)

*Primary Examiner* — Oanh Duong
(74) *Attorney, Agent, or Firm* — Sunstein Kann Murphy & Timbers LLP

(57) ABSTRACT

Brokerage transactions servers and related methods are provided having low latency. In a first embodiment of the invention there is provided a method of processing exchange transaction information for exchange brokerage purposes in an inbound digital message stream in a first protocol dialect. One embodiment utilizes canonical FIX messages for processing purposes. A related embodiment includes, for each message in the stream, storing in memory each successive change made to the message and any metadata created by the foregoing processes; and in an encapsulation process, accessing memory and creating an encapsulated version of the message that includes: (i) the message in original form prior to the receiver process, (ii) the metadata, and (iii) each successive change made to the message by any of the foregoing processes.

31 Claims, 3 Drawing Sheets

(56) References Cited

U.S. PATENT DOCUMENTS

| | | | |
|---|---|---|---|
| 2009/0094151 A1* | 4/2009 | Mortimer et al. | 705/37 |
| 2009/0138393 A1* | 5/2009 | Lemons et al. | 705/35 |
| 2009/0187502 A1* | 7/2009 | Tully et al. | 705/35 |
| 2009/0222370 A1* | 9/2009 | Deudney | 705/35 |
| 2009/0233718 A1* | 9/2009 | Shelton | 463/42 |
| 2009/0240613 A1* | 9/2009 | Tully et al. | 705/35 |

OTHER PUBLICATIONS

David J. Thibodeau, Jr., Letter to Jakobsche RE: Lime, 1 page, Aug. 30, 2010.

* cited by examiner

| 'E' | 'F' | 'I' | 'X' |
|---|---|---|---|
| Version | Type | Flags | Message Length |
| Transaction ID ||||
| Trading Domain ID ||||
| Source Account ID ||||
| Destination Account ID ||||
| Timestamp (seconds) ||||
| Flags | Status || Reason |
| Options Length ||| FIX Message Length |
| Receive Markup Length ||| Cononical Markup Length |
| Transmit Markup Length ||| Reserved |
| Option Type ||| Option Length |
| Option Value ||||
| FIX Message ||||
| Receive Delta ||||
| Canonical Delta ||||
| Transmit Delta ||||
| Padding ||||

*FIG. 3*

BROKERAGE TRANSACTION SERVER AND METHOD USING ENCAPSULATED MESSAGES

CROSS REFERENCE TO RELATED APPLICATIONS

This application claims the benefit of U.S. Provisional Patent Application No. 61/224,237, filed Jul. 9, 2009, titled "Brokerage Transaction Server and Method Using Encapsulated Messages," the entire contents of which are hereby incorporated by reference herein, for all purposes.

TECHNICAL FIELD

The present invention relates to systems and methods of processing exchange transaction information for exchange brokerage purposes, and more particularly to brokerage transactions servers and related methods.

BACKGROUND ART

It is known in the prior art to provide brokerage transaction servers, which communicate with exchange servers on the one hand and with brokerage customer servers on the other hand. A representative brokerage transaction server (therein called a "gateway") is described in U.S. Pat. No. 5,864,827, which is hereby incorporated herein by reference in its entirety. Technology-based brokerage customers frequently engage in algorithmic trading, which benefits from the ability to execute trades with minimal latency. Some latency is inevitable, because physical processes in computational devices are not instantaneous.

SUMMARY OF EMBODIMENTS

In a first embodiment of the invention there is provided a method of processing exchange transaction information for exchange brokerage purposes in an inbound digital message stream in a first protocol dialect. The method of this embodiment includes, for each message in the stream:

in a receiver process, converting from the first protocol dialect to a canonical protocol;

in a trade process, applying business terms to the message; and in a transmit process, converting from the canonical protocol to a second protocol dialect for transmission of the message in an outbound message stream.

In a further related embodiment, the method includes:

storing in memory each successive change made to the message and any metadata created by the foregoing processes; and in an encapsulation process, accessing memory and creating an encapsulated version of the message that includes (i) the message in original form prior to the receiver process, (ii) the metadata, and (iii) a representation of each successive change made to the message by any of the foregoing processes.

In yet another embodiment, there is provided a brokerage transaction server, for processing exchange transaction information for exchange brokerage purposes in an inbound digital message stream in a first protocol dialect. The server of this embodiment includes:

for each message in the stream:

a receiver, coupled to the inbound stream, that converts the message from the first protocol dialect to a canonical protocol;

a trading domain processor that applies business terms to the message; and a transmitter that converts the message from the canonical protocol to a second protocol dialect for transmission of the message in an outbound message stream.

In a further related embodiment, the server further includes memory, coupled to the receiver, the trading domain processor, and the transmitter, that stores each successive change made to the message and any metadata created by the foregoing processes. The server also includes an encapsulation processor, coupled to the memory, that creates an encapsulated version of the message that includes (i) the message in original form prior to the receiver process, (ii) the metadata, and (iii) each successive change made to the message by any of the foregoing processes.

In embodiments related to each of the foregoing embodiments, the inbound digital message stream is from an electronic exchange server. Optionally, the outbound message stream is directed to a brokerage customer server. Alternatively, the inbound digital message stream is from a brokerage customer server, and optionally, the outbound digital message stream is directed to an electronic exchange server.

Alternatively or in addition, at least one of the first protocol dialect, the second protocol dialect, and the canonical protocol is a version of the FIX protocol. Optionally, the first protocol dialect, the second protocol dialect, and the canonical protocol are versions of the FIX protocol.

In another related embodiment is a method of providing a record of receipt and processing by the brokerage transaction server relating to a specific message in the stream. In this embodiment, the method further includes:

for each message in the stream, storing in a storage medium the encapsulated version of the message;

retrieving from the storage medium an encapsulated version of the specific message; and using data in the encapsulated version of the specific message to reconstruct the specific message as received and processing of the specific message by the brokerage transaction server.

Yet another set of related embodiments provides, for each member of the set, a digital storage medium encoded with instructions that, when loaded into a digital computer system, establishes a distinct one of the methods and servers described above. More specifically, one embodiment of the present invention provides a non-transitory digital storage medium encoded with instructions that, when loaded into a digital computer, cause the computer to implement a method of processing exchange transaction information for exchange brokerage purposes in an inbound digital message stream in a first protocol dialect. The implemented method includes, for each message in the stream, in a receiver process, converting from the first protocol dialect to a canonical protocol; in a trade process, applying business terms to the message; and in a transmit process, converting from the canonical protocol to a second protocol dialect for transmission of the message in an outbound message stream. In a further related embodiment there is provided a non-transitory digital storage system wherein the method further includes: storing in memory each successive change made to the message and any metadata created by the foregoing processes; and in an encapsulation process, accessing memory and creating an encapsulated version of the message that includes (i) the message in original form prior to the receiver process, (ii) the metadata, and (iii) each successive change made to the message by any of the foregoing processes.

BRIEF DESCRIPTION OF THE DRAWINGS

The foregoing features of the invention will be more readily understood by reference to the following detailed description, taken with reference to the accompanying drawings, in which:

FIG. 3 is a diagram of an E-FIX message used in the embodiment of FIG. 3.

DETAILED DESCRIPTION OF SPECIFIC EMBODIMENTS

Definitions. As used in this description and the accompanying claims, the following terms shall have the meanings indicated, unless the context otherwise requires:

A "canonical protocol" associated with a brokerage transaction server is a protocol used internally by the brokerage transaction server as a format of transaction messages processed by the server. Embodiments of the present invention include a brokerage transaction server using a canonical protocol based on the Financial Information eXchange ("FIX") Protocol, which is a series of messaging specifications for the electronic communication of trade-related messages. See the web site at http://www.fixprotocol.org for details on this protocol.

A "protocol dialect" is a native protocol used by a brokerage exchange server or a brokerage customer server as a format of transaction messages.

An "encapsulated version of a message" is a transaction message that includes (i) the message in original form prior to any processing, (ii) metadata relating to the message and its processing, and (iii) each successive change made to the message by any processing. When the original message is in the FIX protocol, an encapsulated version of the message is termed an "E-FIX" transaction message.

Figure 1:
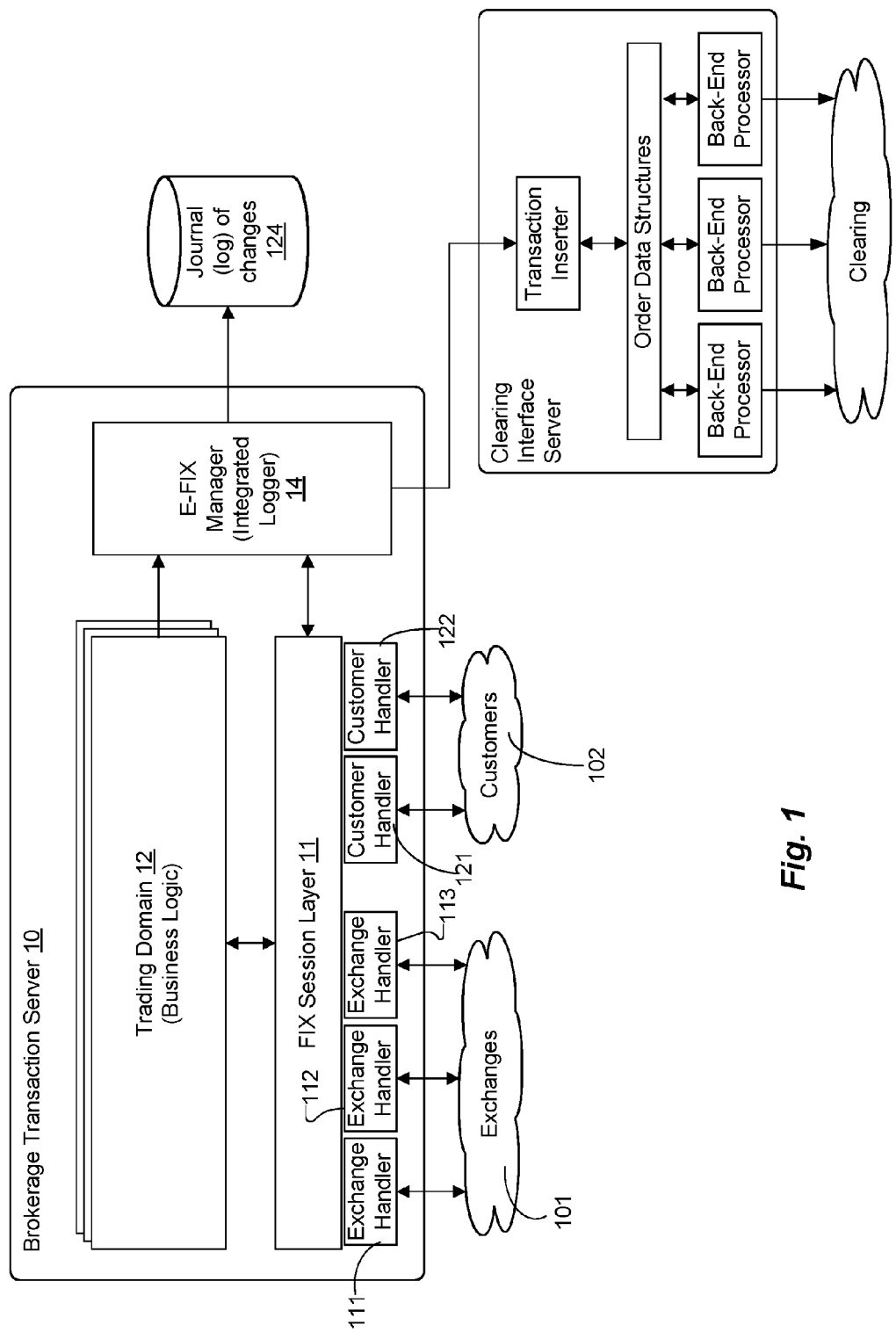
FIG. 1 is a diagram of the architecture of a brokerage transaction server in accordance with an embodiment of the present invention.

FIG. 1 is a diagram of the architecture of a brokerage transaction server (which we sometimes call the "trading server") in accordance with an embodiment of the present invention. The server of this embodiment includes a number of characteristics, including that it communicates with brokerage customer servers, (most) exchange servers, and some other trading platform entities using the FIX protocol. In embodiments herein, a brokerage transaction server communicates with additional internal servers for the purposes of clearing, report generation, risk monitoring, etc. Exchange-to-brokerage communications and customer-to-brokerage communication typically use variants of the FIX protocol, while internal communications among servers according to various embodiments described herein use E-FIX. (We describe E-FIX in detail below in connection with FIG. 3.)

The present embodiment has been developed so that all of the information necessary for high availability, database maintenance, logging, reporting, etc., can be derived solely from the combined FIX streams passing through the brokerage transaction server, augmented by additional information included in E-FIX headers.

In FIG. 1, the brokerage transaction server 10 (sometimes herein called the trading server) includes the following principal architectural components, which are implemented in software: exchange handlers (of which the number may be arbitrary, here represented here by items 111, 112, and 113) for interfacing with exchange servers associated with exchanges 101 of interest; customer handlers (of which the number may be arbitrary, here represented by items 121 and 122) for interfacing with brokerage customer servers of customers 102; FIX session layer 11, which supervises communications with exchanges 102 and with customers and passes messages to and from trading domains 12 (of which the number may be arbitrary). The trading domains 12 implement the transaction server's business logic in message processing; and E-FIX manager 14 manages all E-FIX transaction messages.

For back-end processing of transactions, the brokerage transaction server 10 is in communication with clearing interface server 15.

A separate exchange handler 111, 112, or 113 is used for interfacing with each different exchange server. Each exchange handler converts messages between the exchange's native protocol (which we call a "protocol dialect") and the brokerage transaction server's canonical FIX. Such conversion may require anything from minor adjustments in the way an exchange uses particular FIX tags to wholesale protocol translation (e.g., when the exchange's server uses OUCH). One exchange handler 111, 112, etc. exists for each separate exchange server to which the trading server is able to connect (INET, ARCA, etc.). Each exchange handler is intended to handle all of the exchange-specific functions necessary for the trading server to operate with that exchange, allowing the remainder of the trading server implementation—in particular the trading domains—to remain exchange-independent.

If customers conform to the canonical FIX protocol, there is no need to convert messages to or from canonical FIX in the customer handlers 121 and 122. However, in the event that a brokerage customer server uses a variant dialect protocol, a customer handler is implemented to translate between the variant dialect and canonical FIX.

Once messages from the exchange servers have been translated into canonical FIX, they are passed to the trading domain 12 corresponding to the account associated with the connection on which the message was received. The trading domain 12 handles the business processing associated with the brokerage function.

A copy of every canonical FIX message that is processed by a trading domain 12 is passed to the E-FIX manager 14. The E-FIX manager 14 is responsible for managing all E-FIX transaction communications to and from the trading server and for maintaining a local E-FIX journal of such transactions. The time-ordered sequence of E-FIX messages that are generated as a result of FIX messages being passed to the E-FIX manager 14 is called the "E-FIX stream." By the time it reaches the E-FIX manager 14, each FIX message is accompanied by a message descriptor that identifies the message's source, destination(s), trading domain, processing status (i.e., whether it was processed successfully, failed validation, rejected, etc.), modification history (a description of any changes—tag adds/modifies/deletes—made to the message in the course of processing it), billing information, etc. This information is used to construct the header used for E-FIX encapsulation.

Figure 2:
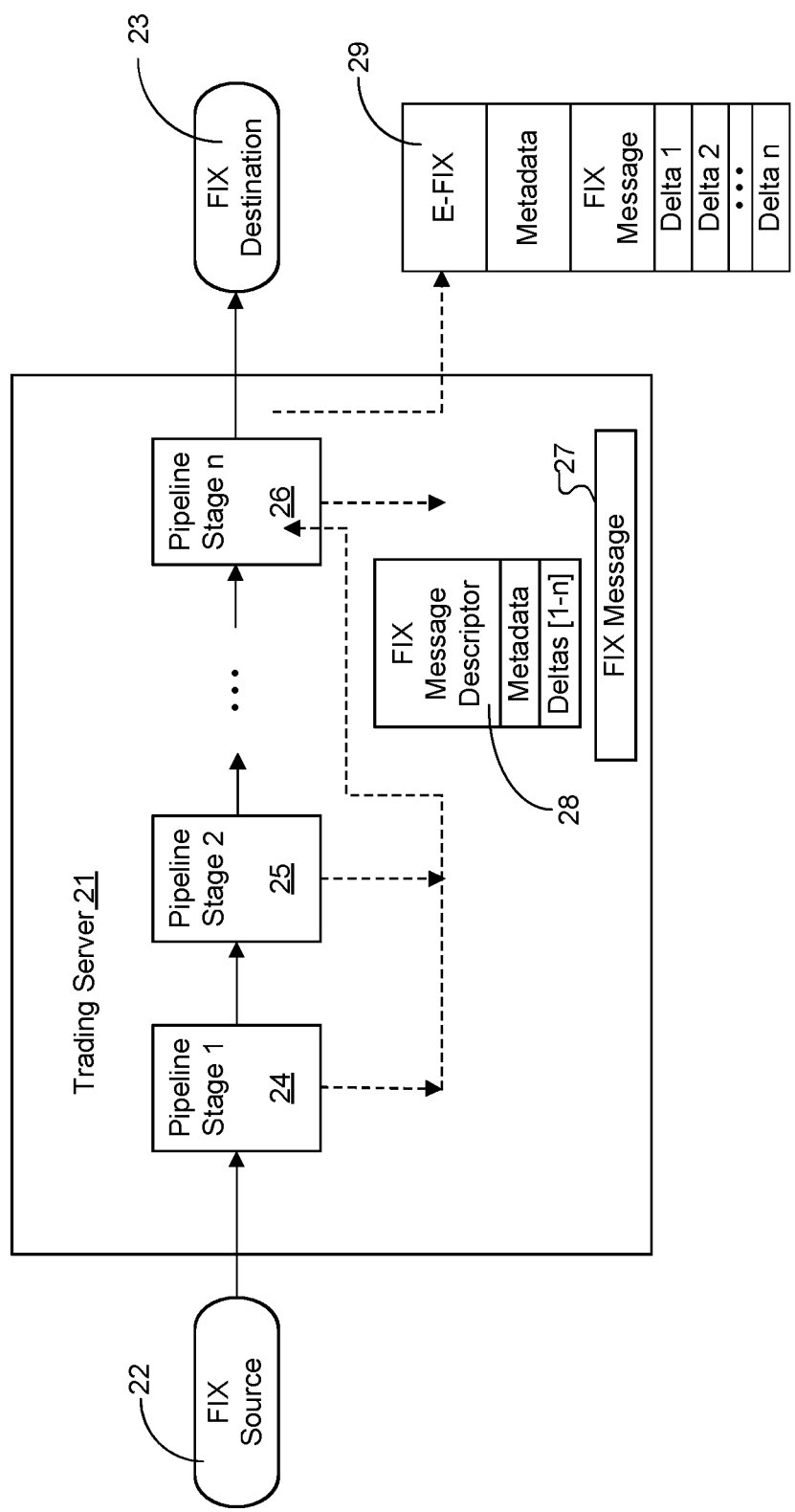
FIG. 2 is a diagram of logical flow of message processing by the brokerage transaction server of FIG. 1.

FIG. 2 is a diagram of logical flow of message processing by the brokerage transaction server of FIG. 1. Here we consider processes implemented by the architecture of FIG. 1. The brokerage transaction server of FIG. 1, the trading server, is here identified as item 21. An input to the trading server 21, which may be a message stream from a server associated with a brokerage customer or with an exchange, is here given a generic label—since the processing stages experienced by any such message stream are similar—as a FIX source 22. The message stream experiences pipeline processing through n stages (here, n=3), and is sent to its FIX destination 23. When the FIX source 22 is an exchange server, then the FIX destination may be one or more brokerage customer servers; and vice versa: when the FIX source 22 is a broker customer server, then the FIX destination may be one or more exchange servers. The processing strategy is to preserve the essential character of each message 27 in the input stream and modifying the message as necessary to produce the desired message format in the output stream. The modifications and metadata, collectively indicated by item 28, associated with each message, are stored in memory during processing. At the end of processing, the E-FIX message 29 is established from the data stored in memory, and the E-FIX message is stored in non-volatile storage 124 (FIG. 1) so as to provide a historic record of the original message and to enable reconstruction of the message through all stages of processing.

Embodiments of the present invention benefit by using canonical FIX in a number of ways. First, the canonical representation enables the business logic to process transactions independent of the protocol dialect of the relevant sources of data. Second, because the canonical protocol used here is based on FIX, and because many of the entities with which the brokerage transaction server is in communication use dialects of FIX, the translation overhead in converting into and out of the canonical protocol is kept to a minimum. In this fashion numbers of fields in messages running through the brokerage transaction server require no translation in either direction. In various embodiments, canonical FIX is implemented both as a normalized version of FIX to provide a standard protocol in which the business logic can operate, and to minimize the translation overhead among protocol dialects.

In the first stage of processing, indicated as pipeline stage 1, item 24, the message is converted from its protocol dialect of FIX into the brokerage transaction server's canonical FIX protocol. (If the incoming message stream is already in canonical FIX, of course no conversion is necessary.) In pipeline stage 2, item 25, the message undergoes business-level validation and processing and is converted from its inbound format to its outbound format. (By such conversion, for example, a message from an exchange server identifying the brokerage server's broker as the trader will be reformatted to identify the brokerage customer as the trader.) In pipeline stage 3, item 26, the message is converted from canonical FIX protocol to into the protocol dialect of the FIX destination 23. (Again, if the FIX destination already uses canonical FIX, then of course no conversion is necessary.) As discussed previously, by the time the processed message is provided as an output to the FIX destination 23, there has also been established a corresponding E-FIX message that is stored to document the receipt, processing, and export of the message.

We now turn to E-FIX transaction message structure, which is shown in FIG. 3. As discussed, an E-FIX transaction message contains a copy of the FIX message that was processed by the trading server, along with additional information such as validation/processing status, timestamps, trading domain identification, and fees/rebates. In addition, each E-FIX transaction message contains a description of the modifications that were made to the encapsulated FIX message in the course of forwarding it to the destination exchange or customer. These transaction messages are identical to the entries written to the trading server's local E-FIX journal, which may be used to recover server state following a crash or power failure.

The E-FIX protocol is primarily unidirectional, with information flowing from a brokerage transaction server to one or more auxiliary brokerage servers (such as the clearing interface server, discussed below), which we here call "E-FIX listeners." The sequence of E-FIX messages corresponding to the activity on a brokerage transaction server is called an "E-FIX stream." One E-FIX listener may be designated as the "synchronous" listener. The brokerage transaction server will attempt to maintain loose synchronization with that listener by limiting the number of outstanding (unacknowledged) transactions at any given time. E-FIX runs over a reliable transport protocol, such as TCP. This eliminates the need for explicit fragmentation, retransmission, acknowledgment, and sequencing. The only exception is a mechanism for optional application-level acknowledgment used to maintain synchronization with the synchronous listener.

In FIG. 3, we see fields used in the E-FIX transaction message. Each E-FIX message begins with a fixed-size header. The format of the portions of the message following the header depends on the contents of the Type field. "EFIX" Marker (32 bits): The first four bytes of every E-FIX message contain the ASCII characters 'E', 'F', 'I', and 'X', respectively (i.e., the 32-bit integer 0x45464958 in network byte order). This marker allows the receiver to more easily detect errors that result in loss of synchronization with message boundaries within the TCP byte stream. Version (8 bits): Indicates the format of the E-FIX header. Type (8 bits): Indicates the type of the message. The following message types are defined:

1. Join
2. Transaction
3. Acknowledgment
4. End

Flags (3 bits): Reserved, must be zero.

Message Length (13 bits): An unsigned integer indicating the total length of the message, including the E-FIX header, in bytes. The maximum length of an E-FIX message is 8,191 bytes.

Transaction ID (64 bits): The identifier associated with this transaction. Within a given trading day, the transaction IDs generated by a trading server are guaranteed to be unique and strictly increasing, i.e., each transaction ID is strictly greater than all earlier IDs generated that day. Transaction IDs are not globally unique across trading servers and/or trading days and are not guaranteed to be consecutive.

Trading Domain ID (32 bits): The unique ID of the trading domain that processed the transaction. For messages that are not associated with a trading domain (e.g., certain session layer messages), this field contains zero.

Source Account ID (32 bits): The unique ID of the market or client account that originated the transaction. For messages originated by the trading server itself (e.g., position responses), this field contains zero.

Destination Account ID (32 bits): The unique ID of the market or client account to which the transaction was sent. For messages consumed by the trading server itself (e.g., position requests), this field contains zero.

Timestamp (64 bits): The time at which the transaction was committed, expressed as a standard POSIX timeval value (i.e., the number of seconds and microseconds since midnight GMT on Jan. 1, 1970).

Flags (8 bits): Note: In the descriptions below, bit 7 is the least significant bit; bit 0 is the most significant. Bit 7: Acknowledgment Requested. Indicates that the receiving E-FIX listener should send an application-level E-FIX Acknowledgment message back to the trading server. The Acknowledgment message should contain the transaction ID of the Transaction message being acknowledged. This flag is used to maintain synchronization with the commit E-FIX listener (typically, the HA standby). Bit 6: Indirect. Indicates that the transaction originated on another trading server. This flag is set by standby trading servers and by other devices that forward E-FIX messages received from an active server. Bit 5: Exclude Primary. Indicates that the encapsulated FIX message was not sent to the destination account's primary FIX session, i.e., that it was sent only to the sessions indicated by the Destination Session options. Bit 4: Truncated. Indicates that the received FIX message exceeded the maximum allowed length of 2048 bytes and that the contents of the received message field have been truncated. Bits 0-3: Reserved, must be zero.

Status (8 bits): Indicates the status of trading server processing of the transaction.

Reason (16 bits): Gives additional information related to the contents of the Status field.

Options Length (16 bits): Indicates the length in bytes of the Options portion of the Transaction message. A length of zero indicates that the Options field is not present.

FIX Message Length (16 bits): Indicates the length in bytes of the encapsulated FIX message. A length of zero indicates that the FIX Message field is not present.

Receive Delta Length (16 bits): Indicates the length in bytes of the Receive Delta portion of the Transaction message. A length of zero indicates that the Receive Delta field is not present.

Canonical Delta Length (16 bits): Indicates the length in bytes of the Canonical Delta portion of the Transaction message. A length of zero indicates that the Canonical Delta field is not present.

Transmit Delta Length (16 bits): Indicates the length in bytes of the Transmit Delta portion of the Transaction message. A length of zero indicates that the Transmit Delta field is not present.

Reserved (16 bits): Must be zero.

Options (variable length): The Options field contains a list of optional items related to the transaction. Each item is encoded as a <type, length, value>triplet.

The Option Type field identifies the option; Option Length is a 16-bit unsigned integer containing the length of the option, including the type and length fields, in bytes. Option Value is variable-length; its interpretation depends on the option type. The following option types are defined:

1. Authority (variable-length). The username of the user that initiated the transaction.

2. Source Session (32 bits). The session ID of the session on which the message was received (omitted if the message was received on the primary session).

3. Destination Session (12 bytes). The 32-bit session ID and the 64-bit sequence number of each non-primary session to which the message was sent.

4. Fee (variable-length). A 3-tuple encoded as <Authority> SOH <Execution ID> SOH <Amount>

5. Rebate (variable-length). A 3-tuple encoded as <Authority> SOH <Execution ID> SOH <Amount>

6. Fee Reversal (variable-length). A 4-tupal encoded as <Authority> SOH <Execution ID> SOH <Original Execution ID> SOH <Amount>

7. Rebate Reversal (variable-length). A 4-tupal encoded as <Authority> SOH <Execution ID> SOH <Original Execution ID> SOH <Amount>

8. Log Level (8 bits). An unsigned integer.

9. External ID (variable-length). A market-specific character string.

10. Received Message (variable-length). A copy of the message as received directly from the source. Intended primarily for non-FIX messages.

11. Transmitted Message (variable-length). A copy of the message as transmitted directly to the destination. Intended for non-FIX messages and for FIX messages in cases where an exact copy is required in addition to the transmit Delta.

12. Account (32 bits). The account ID of the account associated with the transaction, if different from the source account.

13. Buying Power (96 bits). The current buying power of the account associated with the transaction. The value is expressed as a signed 64-bit integer with units specific to the trading domain (e.g., pennies for U.S. equities trading domains). The value is preceded by 32 bits of padding in order to preserve natural alignment. A single Transaction message may contain multiple occurrences of a given option type.

FIX Message (variable length): The encapsulated FIX message.

Receive Delta (variable length): The Receive Delta field describes the modifications that were made to the encapsulated FIX message in order to convert it to canonical FIX. Modifications include adding, replacing, and deleting FIX fields. This field consists of a sequence of items, each of which is terminated by an ASCII SOH character. Each item is either an ASCII-encoded FIX tag number (integer) or a tag number followed by an equals sign ('=') and a value string. Stand-alone tag numbers represent FIX fields that were removed from the original message during processing; tag=value items represent FIX fields that were either added (if not present in the original message) or replaced (if present in the original message). Tags should not be repeated. If the Transaction message does not contain an encapsulated FIX message (i.e., the FIX Message Length contains zero), then the Receive Delta conceptually operates on an empty FIX message.

Canonical Delta (variable length): The Canonical Delta field describes the modifications that were made to the received canonical FIX message (i.e., the result of applying the Receive Delta to the encapsulated FIX message) in the course of FIX session layer and trading domain processing. This field has the same format as the Receive Delta field.

Transmit Delta (variable length): The Transmit Delta field describes the modifications that were made to the transmitted Canonical FIX message (i.e., the result of applying the Receive Delta and Canonical Delta to the encapsulated FIX message) in order to conform to the requirements of the destination. This field has the same format as the Receive Delta and Canonical Delta fields.

The software structures described in this application may be implemented in general purpose digital computers, running standard operating systems such as Linux. Accordingly, when such a computer is loaded with suitable instructions stored in a digital storage medium, there can be established embodiments of the brokerage transaction server described above and claimed below, and there can be established embodiments of the clearing interface server described above. A digital storage medium storing such instructions is also within the scope of embodiments described herein. A computer running embodiments of the brokerage transaction server application has network connections to the brokerage customer servers, to the exchange servers, and to the computer hosting the clearing interface. Such computers may usefully have multiple CPUs. Alternatively the software structures may be implemented directly in hardware, using, for example, field programmable gate arrays (FPGAs) or application specific integrated circuits (ASICs).

The embodiments of the invention described above are intended to be merely exemplary; numerous variations and modifications will be apparent to those skilled in the art. All such variations and modifications are intended to be within the scope of the present invention as defined in any appended claims.

Some of the functions performed by the brokerage transactions server have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. Furthermore, although some aspects of the brokerage transactions servers have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A method of processing exchange transaction information for exchange brokerage purposes in an inbound digital message stream in a first protocol dialect, the method comprising:
   for each message in the stream:
      in a first processing stage, in a receiver process, modifying the message by converting the message from the first protocol dialect to a canonical protocol;
      in a second processing stage, in a trade process, modifying the message in the canonical protocol by applying business terms to the message;
      in a third processing stage, in a transmit process, modifying the message by converting the message from the canonical protocol to a second protocol dialect for transmission of the message in an outbound message stream;
      in an integrator process:
         storing, in the message, a copy of the message before the message was modified in the first processing stage; and
         storing, in the message, descriptions of successive modifications of the message, made by the receiver process, by the trade process and by the transmit process, each description comprising an identifier of a field that was modified in the message and, if the field was not removed by the modification, an indication of a value of the field, such that the stored copy of the message and the descriptions are sufficient to enable reconstruction of the message through the first, second and third processing stages; and
   for at least one message in the outbound message stream, using the stored copy of the message and the descriptions to reconstruct the message.

2. The method according to claim 1, wherein storing the descriptions of the successive modifications comprises:
   storing in memory each successive change made to the message and any metadata created by any of the receiver process, the trade process and the transmit process; and
   accessing the memory and creating an encapsulated version of the message that includes:
      (i) the message in original form prior to the receiver process,
      (ii) the metadata, and
      (iii) said each successive change made to the message by any of the receive process, the trade process and the transmit process.

3. The method according to claim 2, wherein the inbound digital message stream is from an electronic exchange server.

4. The method according to claim 3, wherein the outbound message stream is directed to a brokerage customer server.

5. The method according to claim 2, wherein the inbound digital message stream is from a brokerage customer server.

6. A method according to claim 5, wherein the outbound digital message stream is directed to an electronic exchange server.

7. The method according to claim 2, wherein at least one of the first protocol dialect, the second protocol dialect, and the canonical protocol is a version of the FIX protocol.

8. The method according to claim 2, wherein the first protocol dialect, the second protocol dialect, and the canonical protocol are versions of the FIX protocol.

9. The method according to claim 2, of providing a record of receipt and processing by the brokerage transaction server relating to a specific message in the stream, the method further comprising:
   for said each message in the stream, storing in a storage medium the encapsulated version of the message;
   retrieving from the storage medium an encapsulated version of the specific message;
   using data in the encapsulated version of the specific message to reconstruct the specific message as received and processing of the specific message by the brokerage transaction server.

10. The method according to claim 1, wherein the inbound digital message stream is from an electronic exchange server.

11. The method according to claim 10, wherein the outbound message stream is directed to a brokerage customer server.

12. The method according to claim 1, wherein the inbound digital message stream is from a brokerage customer server.

13. The method according to claim 12, wherein the outbound digital message stream is directed to an electronic exchange server.

14. The method according to claim 1, wherein at least one of the first protocol dialect, the second protocol dialect, and the canonical protocol is a version of the Financial Information eXchange ("FIX") protocol.

15. The method according to claim 1, wherein the first protocol dialect, the second protocol dialect, and the canonical protocol are versions of the FIX protocol.

16. A brokerage transaction server, for processing exchange transaction information for exchange brokerage purposes in an inbound digital message stream in a first protocol dialect, the server comprising:
   a receiver, coupled to the inbound stream, that, in a first processing stage, converts each message in the stream from the first protocol dialect to a canonical protocol;

a trading domain processor that, in a second processing stage, applies business terms to said each message in the canonical protocol in the stream;

a transmitter that, in a third processing stage, converts said each message in the stream from the canonical protocol to a second protocol dialect for transmission of the message in an outbound message stream;

an integrated logger that, for each said message, stores, in the message, a copy of the message before the message was modified in the first processing stage and, stores, in the message, descriptions of successive modifications of said each message in the stream, by the receiver, by the trading domain processor and by the transmitter, into a journal file distinct from the message, each description comprising an identifier of a field that was modified in the message and, if the field was not removed by the modification, an indication of a value of the field, such that the stored copy of the message and the descriptions are sufficient to enable reconstruction of the message through the first, second and third processing stages; and a listener coupled to the journal file and configured to reconstruct a message in the outbound message stream from the integrated history stored in the journal file.

17. The server according to claim 16, wherein the integrated logger is configured to:

store in the journal file each successive change made to the message and any metadata created by any of the receiver process, the trade process and the transmit process; and create an encapsulated version of the message that includes:
   (i) the message in original form prior to the receiver process,
   (ii) the metadata, and
   (iii) said each successive change made to the message by any of the receiver process, the trade process and the transmit process.

18. The server according to claim 17, wherein the inbound digital message stream is from an electronic exchange server.

19. The server according to claim 18, wherein the outbound message stream is directed to a brokerage customer server.

20. The server according to claim 17, wherein the inbound digital message stream is from a brokerage customer server.

21. The server according to claim 20, wherein the outbound digital message stream is directed to an electronic exchange server.

22. The server according to claim 17, wherein at least one of the first protocol dialect, the second protocol dialect, and the canonical protocol is a version of the FIX protocol.

23. The server according to claim 16, wherein the first protocol dialect, the second protocol dialect, and the canonical protocol are versions of the FIX protocol.

24. The server according to claim 17, wherein the first protocol dialect, the second protocol dialect, and the canonical protocol are versions of the FIX protocol.

25. The server according to claim 16, wherein the inbound digital message stream is from an electronic exchange server.

26. The server according to claim 25, wherein the outbound message stream is directed to a brokerage customer server.

27. The server according to claim 16, wherein the inbound digital message stream is from a brokerage customer server.

28. The server according to claim 27, wherein the outbound digital message stream is directed to an electronic exchange server.

29. The server according to claim 16, wherein at least one of the first protocol dialect, the second protocol dialect, and the canonical protocol is a version of the Financial Information eXchange ("FIX") protocol.

30. A non-transitory digital storage medium encoded with instructions that, when loaded into a digital computer, cause the computer to implement a method of processing exchange transaction information for exchange brokerage purposes in an inbound digital message stream in a first protocol dialect, wherein the method comprises:

for each message in the stream:
   in a first processing stage, in a receiver process, modifying the message by converting the message from the first protocol dialect to a canonical protocol;
   in a second processing stage, in a trade process, modifying the message in the canonical protocol by applying business terms to the message;
   in a third processing stage, in a transmit process, modifying the message by converting the message from the canonical protocol to a second protocol dialect for transmission of the message in an outbound message stream;
   in an integrator process:
      storing, in the message, a copy of the message before the message was modified in the first processing stage; and
      storing, in the message, descriptions of successive modifications of the message made by the receiver process, by the trade process and by the transmit process, each description comprising an identifier of a field that was modified in the message and, if the field was not removed by the modification, an indication of a value of the field, such that the stored copy of the message and the descriptions are sufficient to enable reconstruction of the message through the first, second and third processing stages; and for at least one message in the outbound message stream, using the integrated history to reconstruct the message.

31. The non-transitory digital storage medium according to claim 30, wherein storing the descriptions of the successive modifications comprises:

storing in memory each successive change made to the message and any metadata created by any of the receiver process, the trade process and the transmit process; and accessing memory and creating an encapsulated version of the message that includes:
   (i) the message in original form prior to the receiver process,
   (ii) the metadata, and
   (iii) said each successive change made to the message by any of the receiver process, the trade process and the transmit process.

\* \* \* \* \*